US006263435B1

United States Patent
Dondeti et al.

(10) Patent No.: US 6,263,435 B1
(45) Date of Patent: Jul. 17, 2001

(54) DUAL ENCRYPTION PROTOCOL FOR SCALABLE SECURE GROUP COMMUNICATION

(75) Inventors: Lakshminath R. Dondeti, Omaha, NE (US); Sarit Mukherjee, Mount Laurel, NJ (US); Ashok Samal, Lincoln, NE (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/401,450

(22) Filed: Sep. 22, 1999

(51) Int. Cl.$^7$ .................................................... H04L 9/00

(52) U.S. Cl. .................. 713/163; 713/155; 713/156; 713/162; 713/176; 380/259; 380/260; 380/278; 380/279; 380/281; 380/282; 380/30

(58) Field of Search ..................................... 713/155, 156, 713/162, 163, 176; 380/259, 260, 278, 279, 281, 282, 30

(56) References Cited

U.S. PATENT DOCUMENTS

| | | | |
|---|---|---|---|
| 5,592,552 | * | 1/1997 | Fiat ........................................ 380/21 |
| 5,748,736 | * | 5/1998 | Mittra ..................................... 380/21 |
| 5,831,975 | * | 11/1998 | Chen et al. ........................... 370/256 |

OTHER PUBLICATIONS

Dual Encryption Protocol for Scalable Secure Multicasting (Dondeti et al., Jul. 6, 1998, IEEE, all).*
"Tracing Traitors" (Chor et al., May 2000, IEEE Transactions on Information Theory, all).*
"Comparison of Scalable Key Distribution Schemes for Secure Group Communication" (Dondeti et al., 1999, IEEE, all).*

* cited by examiner

Primary Examiner—Tod Swann
Assistant Examiner—Paul E. Callahan
(74) Attorney, Agent, or Firm—Harness, Dickey & Pierce, P.L.C.

(57) ABSTRACT

A logical tree structure and method for managing membership in a multicast group provides scalability and security from internal attacks. The structure defines key groups and subgroups, with each subgroup having a subgroup manager. Dual encryption allows the sender of the multicast data to manage distribution of a first set of encryption keys whereas the individual subgroup managers manage the distribution of a second set of encryption keys. The two key sets allow the sender to delegate much of the group management responsibilities without compromising security because a key from each set is required to access the multicast data. Security is further maintained via a method in which subgroup managers can be either member subgroup managers or participant subgroup managers. Access to both keys is provided to member subgroup managers whereas access to only one key is provided to participant subgroup managers. Nodes can be added without the need to generate a new encryption key at the top level which provides improved scalability.

16 Claims, 3 Drawing Sheets

| Authentication Information | Authorization Information |
|---|---|
| Host Name | Multicast Group Name |
| Host Identifier | Multicast Group Identifier |
| Host Public Key | Membership Duration [Start time, Finish Time] |
| Signed by Certification Authority ||

Figure 1

| Host Id | Multicast Group Id |
|---|---|
| Host Public Key | Key Group Id |
| Membership Duration | SGM Id |
| Signed by the Sender ||

Figure 3

DUAL ENCRYPTION PROTOCOL FOR SCALABLE SECURE GROUP COMMUNICATION

BACKGROUND AND SUMMARY OF THE INVENTION

The present invention relates generally to multicasting. More particularly, the invention relates to a dual encryption protocol for scalable secure group communication.

With the widespread use of the Internet, securing data transmissions is an important requirement for many applications. Several protocols exist to address security in data networks with respect to unicasting. Unfortunately, these protocols cannot be easily extended to protect multicast data.

Multicasting poses several problems that do not come up in securing unicast data transfers. First, multicast addresses are not private, which enables any interested host to join the multicast session without any hindrance. Next, multicast data is transmitted over many channels of the network, which presents multiple opportunities for attacks such as eavesdropping. Furthermore, any host in the Internet can send irrelevant data to the multicast group, which may cause congestion. The universal knowledge of multicast addresses also allows any host to pose as a member of the group, thereby allowing it to gain access to the multicast data. Finally, adversaries can possibly disrupt the multicast protocol itself by posing as legitimate members of the group.

Multicasting is a scalable way of transmitting data to a group hosts and any secure multicasting protocol must be scalable as well. A secure group communication protocol should provide group membership control, secure key distribution, and secure data transfer. If the multicast group membership is dynamic, i.e., if the group members join and leave during the course of a multicast session, the secret keys need to be updated accordingly. In other words, members of a multicast session must not be able to access the multicast data transmitted before their membership has begun or after their membership has expired. Scalability in this context implies that the overhead involved in key updates, data transmission and encryption must be independent of the size of the multicast group. The other requirement of scalability is that the addition or removal of a host from the group should not affect all the members of the group. The second rule is called "1 affects n" scalability problem.

Several protocols have been proposed to support secure multicasting. Based on the corresponding key distribution protocols, we can broadly classify them into three categories, viz., centralized flat schemes, distributed flat schemes and hierarchical schemes.

Centralized flat schemes consist of a single entity distributing the encryption keys to the group members. On each membership change the group manager securely transmits updated key(s) to all the members. Thus these schemes suffer from the 1 affects n scalability problem.

Distributed flat schemes trust all the group members equally. Members joining early create and distribute the encryption keys. Trusting all the members makes this protocol vulnerable to security attacks from inside the group.

Hierarchical schemes distribute encryption keys via a distribution tree. Two classes of hierarchical protocols have been proposed. The first class uses a hierarchy of keys while the second group uses a hierarchy of nodes to achieve scalability.

Hierarchical key based schemes suffer from the 1 affects n scalability problem. Typical hierarchical node schemes entrust internal nodes of the key-distribution tree with the distribution of the encryption keys. But they offer no mechanism to hide secure multicast data from the internal nodes.

The present invention proposes a dual encryption protocol (DEP) for scalable secure multicasting which supports one-to-many group communication. The invention uses hierarchical subgrouping of multicast members to address scalability. Each subgroup is managed by a subgroup manager (SGM) which assists in key distribution as well as group access control. The protocol also distinguishes between participants and members of the multicast group. Members of the multicast group are leaf nodes and internal nodes (SGMs) in the key distribution tree, that are entitled to the multicast data. On the other hand, participants of the multicast group are SGMs that assist in enforcing the secure multicast protocol without having any access to the multicast data. The dual encryption scheme enables the protocol to hide multicast data from the participants.

For a more complete understanding of the invention, its objects and advantages, reference may be had to the following specification and to the accompanying drawings.

BRIEF DESCRIPTION OF THE DRAWINGS

FIG. 1 is a data structure diagram of the capability certificate;

FIG. 3 is a data structure diagram of the authorization certificate;

DETAILED DESCRIPTION OF THE PREFERRED EMBODIMENT

Introduction to the Dual Encryption Protocol

Figure 2:
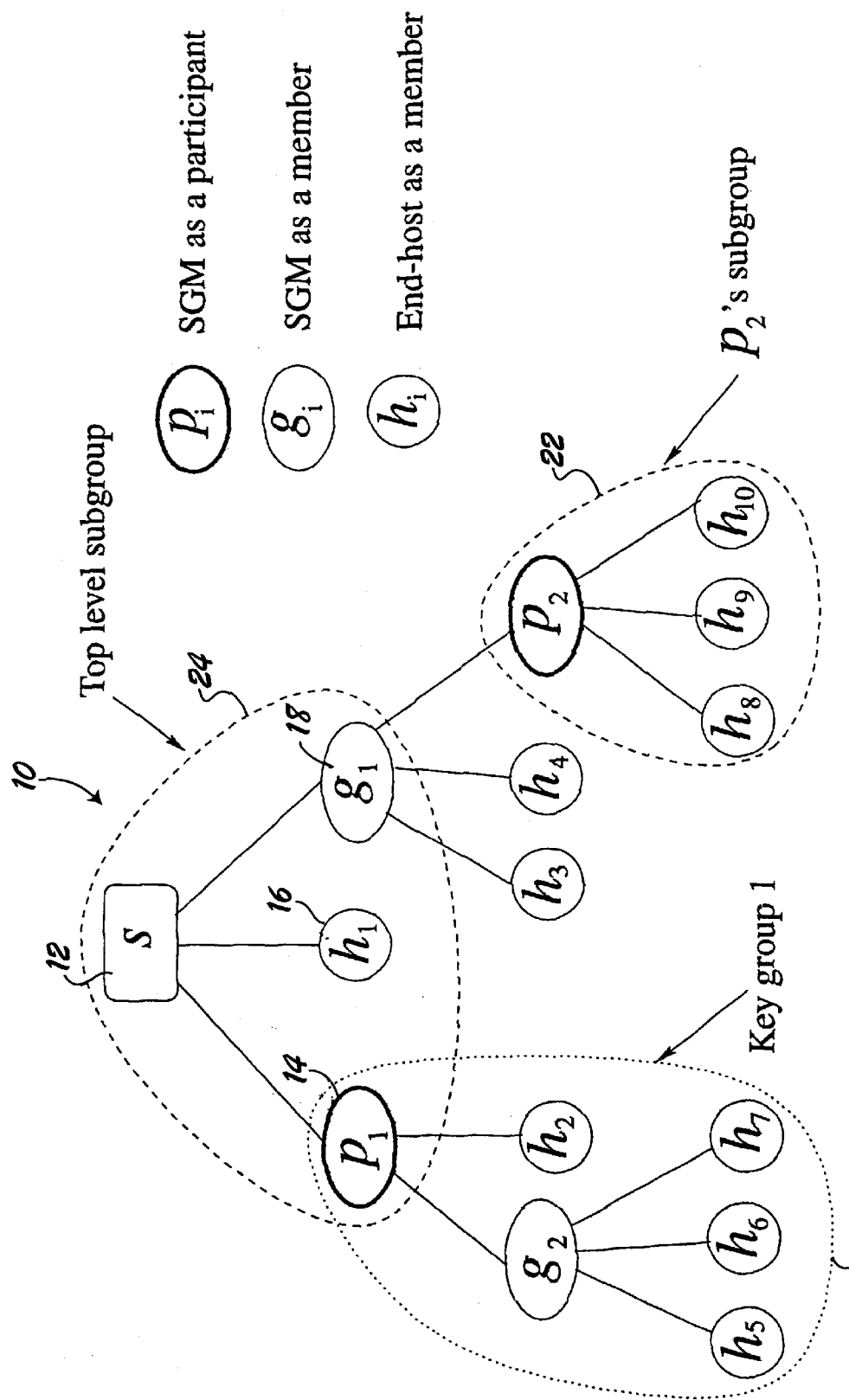
FIG. 2 is a logical tree structure in accordance with the present invention.

The dual encryption protocol is well suited for scalable secure multicasting. The protocol supports secure one-to-many group communication, dynamic group membership and is scalable. The protocol uses hierarchical subgrouping of multicast members to address scalability. Each subgroup is managed by a subgroup manager (SGM). SGMs are either routers or hosts in the network that can handle the workload of managing a subgroup of the multicast group. The assumption is that the SGMs conform to the secure multicast protocol and do not actively participate in disrupting it. There is a distinction between participants and members of the group. Members of the group are end-hosts or SGMs that are entitled to the multicast data. On the other hand, participants of the group are SGMs that assist in enforcing the secure multicast protocol without having any access to the multicast data. With this distinction, it is possible to have SGMs assist in the secure multicast protocol without getting access to multicast data.

The dual encryption protocol uses two sets of encryption keys that assist in secure distribution of data encryption keys to multicast members. The first set of keys, called local subgroup keys (LS), are used by SGMs to distribute encrypted data and encryption keys to their corresponding subgroup members. The second set of keys, called top level key encrypting keys (KEK), are used by the sender to hide data encryption keys from participant SGMs. The logical tree structure classifies the members and participants of the multicast group into key groups. The members in each key group get access to the same KEK. Nodes of each subtree rooted at one of the sender's children belong to the same key group. Nodes of different subtrees rooted at the sender's children may belong to the same key group. The number of key groups however is limited by the number of SGMs among the sender's children. The protocol uses public-key encryption for securely distributing the top level KEK's and the subgroup keys.

Details of an Exemplary Embodiment

The protocol uses capability certificates to enforce group access control. An exemplary capability certificate is shown in FIG. 1. For large multicast groups, access control lists can be very large. Furthermore, the sender may not know all the group members in advance. Our protocol requires that all the members obtain a capability certificate from designated certification authorities. These certificates authenticate hosts and authorize them to be members of the multicast group. The authorization information also includes the time duration for which the group member is entitled to multicast data. The sender and the SGMs verify the capability certificates before distributing encryption keys to group members.

Table 1 below sets for the notation used in this document to describe the presently preferred protocol. Reference may be had to this table when reviewing the equations set forth herein.

TABLE 1

Notation Used in this Paper

| | |
|---|---|
| s | Sender |
| SGM | Subgroup manager |
| $LS_i$ | Local subgroup key managed by SGM i |
| $M_i$ | Set of subgroup members of SGM i |
| $\kappa_i$ | Set of nodes of the key distribution tree in the key group i |
| $KEK_i$ | Key encrypting key corresponding to the key group |
| DEK | Data encryption key used in encrypting multicast data |
| $CC_x$ | Capability Certificate of x |
| $AC_x$ | Authorization Certificate issued to x by s |
| $KU_x$ | Public-key of x |
| $KR_x$ | Private-key of x |
| EP | Public-key encryption |
| ES | Secret-key encryption |
| HV | Hash value |
| x→y: w | x sends "w" to y |

FIG. 2 illustrates an exemplary logical tree structure in accordance with the invention. In this regard, the tree structure illustrated is merely exemplary (other tree structures are possible). Moreover, the tree structure illustrated is a logical tree structure; that is, the actual physical connections among nodes, and the route a communication would take are not restricted to this logical tree structure. The logical tree structure 10 thus serves as a framework or structure for managing membership in the multicast group and for managing access to multicast data.

As depicted in FIG. 2, members of the multicast group are nodes of a tree. The top node 12 is the sender node. The sender node sends multicast data to one or more end-host nodes, depending on their authorization.

The top node (sender) 12 has, in this illustration, three child nodes 14, 16 and 18. Each of these child nodes may define what we call a key group. In FIG. 2, child nodes 14 and 18, themselves, have children; node 16 is childless. Thus in this illustration there are two key groups, one containing node 14 and its children and one containing node 18 and its children. In the description that follows, we refer to the key group containing node 14 as key group 1. Key group 1 is shown in dotted lines designated by reference numeral 20.

Logical tree 10 forms part of a key distribution tree as will be more fully explained below. The key distribution tree can be either an extension of a multicast data distribution tree or a virtual tree at the application level. In addition to the key groups, described above, the key distribution tree also defines what we call subgroups. Subgroups are represented by non-leaf nodes and their children. In FIG. 2, the leaf nodes have been designated as end-host members $h_i$. In FIG. 2 the non-leaf nodes have been designated as either subgroup manager (SGM) participants $p_i$ or SGM members $g_i$. Thus FIG. 2 illustrates four subgroups corresponding to the following SGM's: $p_1$, $g_2$, $g_{1\ and\ p2}$. For illustration purposes, lower case $p_2$'s subgroup is shown in dashed lines at 22. Similar in structure is the top level subgroup shown in dashed lines at 24. The top level subgroup contains at its head the top node (sender node) 12.

Each subgroup manager (SGM) is responsible for generating a secret key and sharing it with all the corresponding subgroup members in a secure fashion. For instance, in FIG. 2, $p_1$ shares the subgroup key $LS_{p1}$ with its children, $g_2$ and $h_2$. We refer to this key as a local subgroup key. The local subgroup key forms one part of the dual key protocol needed to access encrypted data.

The sender node 12 generates another key that we call the key encrypting key or KEK. Sender node 12 generates a top level KEK for each of the key groups. Sender node 12 also generates a local subgroup key for the top level subgroup 24. The KEK's are used to hide data encryption keys from the participants of a multicast group. One KEK is generated for each of the key groups. These keys are distributed to the multicast members by the sender. A KEK is shared by all the nodes in a key group that are members of the multicast group. In this context, it is important to distinguish a member from a participant. Participants assist in enforcing the secure multicast protocol, but they do not have any access to the multicast data. In the exemplary embodiment shown in FIG. 2, there could be at most two key groups, corresponding to each of the sender's children that are also SGM's, namely participant SGM $p_1$ and member SGM $g_1$. The end-host member $h_1$ could belong to either one of the key groups.

All members and participants of the multicast group must be aware of the key group they belong to. We delegate the responsibility of propagating this information to the subgroup managers. The sender 12 assigns and distributes key group ID's to the subgroup managers that are members of the top level subgroup. Each SGM disseminates its key group ID to its subgroup members when they join the group. Thus, all the members and participants of the multicast session are aware of the corresponding key group ID. The join protocol, described below, serves as the mechanism for distributing the secret keys in accordance with the dual encryption scheme.

Join Protocol

Figure 4:
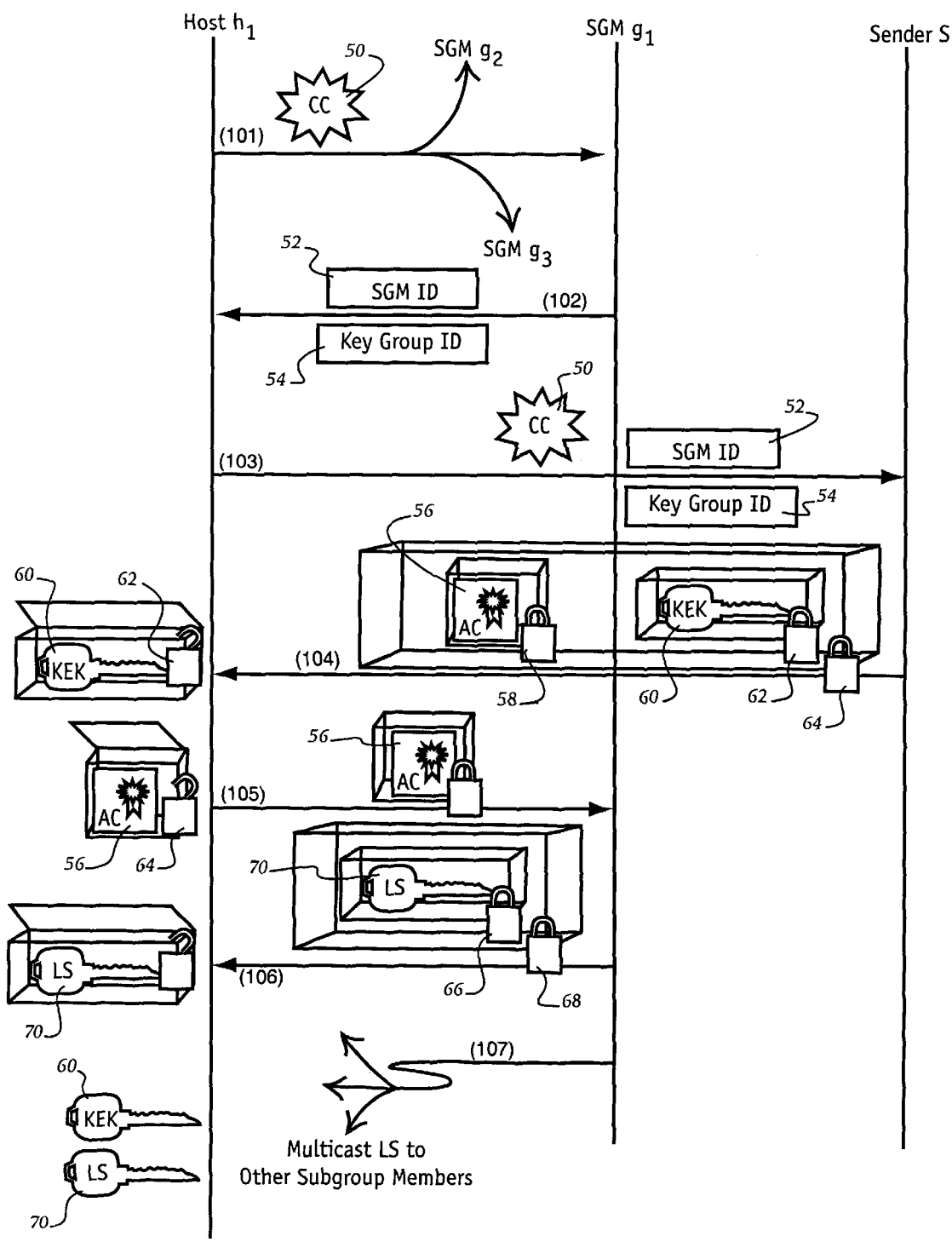
FIG. 4 is a sequence diagram illustrating the process for joining a multicast group in accordance with the present invention.

Referring to FIG. 4, when a new host $H_1$ wants to join the secure multicast group, it sends a message to all SGMs of the multicast group as illustrated at 101. The message includes host $H_1$'s capability certificate 50. After sending its message to all SGMs of the group, host $H_1$ waits until one of the SGMs answers. In this illustration, SGM $g_1$ responds that it can handle the additional work load of another member in its subgroup. More specifically, the responding SGM first verifies that the capability certificate is approved or denied. Assuming the certificate is approved, the responding SGM sends a return message comprising its SGM I.D. 52 and its keygroup I.D. 54.

In the illustrated example, SGM $g_1$ responds first. Other SGMs, such as $g_2$ or $g_3$ may also respond, or not, depending on whether they can support the additional workload.

Host $H_1$ chooses the first positive response it receives (from SGM $g_1$) thereby choosing it as its subgroup manager.

The enrolling host $H_1$ then sends a message to the sender S, comprising authentication information about itself, the responding SGM's identity 52 and the corresponding keygroup identity 54. The authentication information may be either in the form of a capability certificate 50, or other identifier used by the sender to consult an access control list (a database of all hosts that can join).

The sender S uses the capability certificate 50 to decide whether $H_1$ is an authorized member of the multicast group. It also checks to see if $H_1$ has previously requested to join the multicast. This last verification guards against a misbehaving host, trying to join multiple subgroups simultaneously. After the new host's membership is validated, the sender generates message 104, containing a number of items including an authorization certificate 56.

The data structure of the presently preferred authorization certificate is shown in FIG. 3. The authorization certificate contains the new host's identity ($H_1$), the corresponding SGM's identity and the keygroup identity. Sender $S_1$ signs the certificate with its private key, as illustrated diagrammatically by lock 58. The authorization certificate is an authentic record of the new host's affiliation to the multicast group.

Sender $S_1$ also sends the top level KEK encryption key 60 to the joining host. This KEK corresponds to the keygroup identity that $H_1$ is now a part of. Sender $S_1$ signs the top level KEK with its private key, as depicted diagrammatically by lock 62. Then the sender encrypts both authorization certificate 56 and KEK 60 with the host's public key for secrecy. The host's public key is depicted diagrammatically by lock 64.

Note that sender $S_1$ signs the authorization certificate and KEK separately. This allows $H_1$ to produce the signed authorization certificate without having to disclose the KEK. Sender $S_1$ updates its multicast membership database with the new host's authorization certificate. The membership database is used when the sender refreshes the KEK's.

In the final phase of the join protocol, host $H_1$ uses its private key to decrypt the sender's message (to unlock lock 64). It further uses the sender's public key to decrypt the KEK 60 and authorization certificate 56 (unlocking locks 62 and 64, respectively).

Next, host $H_1$ issues message 105 to SGM $g_1$. This message supplies $g_1$ with the new host's authorization certificate 56. Subgroup manager $g_1$ then adds the new host to its subgroup members'list. SGM $g_1$ then changes its subgroup key, signs it (lock 66), encrypts it with $H_1$'s public key (lock 68) and sends it in message 106 to $H_1$. The SGM's signature (lock 66) guards against masquerading attacks. The subgroup key, LS key 70, is changed to keep the new host from decrypting multicast data sent before it joined the group.

Separately, SGM $g_1$ multicasts its signed new subgroup key to all its subgroup members, encrypted with the old subgroup key. This is illustrated at step 107.

As a result of the above-described procedure, new host $H_1$ acquires the KEK key 60 and the LS key 70. Both keys are required to decrypt multicast data at host $H_1$.

FIG. 4 has thus illustrated an example of the join protocol. For readers who prefer a more succinct representation, refer to Table 2.

TABLE 2

Steps in the Join Protocol

| | |
|---|---|
| (1) h→All SGMs: | $CC_h$ |
| (2) g→h: | SGM Id (g), Key group Id ($\kappa_i$) |
| (3) h→s: | $CC_h$, g, $\kappa i$ |
| (4) s→h: | $EP_{KUh}[EP_{KRs}[AC_h], EP_{KRs}[KEK_1]]$ |
| (5) h→g: | $AC_h$ |
| (6) g→h: | $EP_{KUh}[EP_{KRg}[LS_g]]$ |
| (7) g→$M_g$: | $ES_{LSg}[EP_{KRg}[LS_g]]$ |

In view of the foregoing, it should be stressed that authorization certificates serve the important function of eliminating the possibility of an adversary with a valid capability certificate gaining access to all keys managed by the sender and all of the SGMs in the multicast group. In our protocol, the sender checks for duplicate joins by the same host, before issuing an authorization certificate. These certificates authorize the joining host to gain access to only one local subgroup key.

Having thus described the join protocol by which a new host may join the secure multicast group, we now describe the join protocol used by subgroup managers. Subgroup managers (SGMs) that are members of the multicast group follow the join protocol described above for hosts. The only change is that the sender updates its SGM database. The join protocol used for SGMs that are merely participants is different, and somewhat more complex. The sender first verifies if the participant SGM is a former member of the multicast group. If the participant SGM is in the membership database, the corresponding KEK needs to be updated. To change a KEK, the sender sends a message to all the members which hold that KEK, asking them to request the new KEK. The members which need the new KEK respond with their authorization certificates. The sender verifies the authorization certificates, and constructs a list of members authorized to receive the updated KEK. The sender then changes the KEK, signs it, and encrypts it with the public keys of all of the members in the list. It then multicasts all the encrypted KEKs to the multicast group.

Each member waiting for the new KEK decrypts the encrypted KEK intended for it. Finally, the sender updates its membership database, conforming to the authorization list it compiled above. After the verification process and possible modification of a KEK, the join process of a participant SGM follows the same protocol as described above for member SGMs. The only exception that a participant SGM does not receive a KEK.

While the process of changing a KEK is somewhat computationally costly, KEKs need to be changed only when a former member of the multicast group wants to rejoin as a participant SGM. To avoid changing KEKs frequently, an application may deny the join request of a participant SGM if it is still in the membership database.

Secure Communication

The sender generates a data encryption key (DEK) to be used in a conventional encryption algorithm. In this regard, suitable algorithms can be found in *Handbook of Applied Cryptography,* A. Menezes, P. Van Oorschot, S. VanStone, CRC Press, 1997; and *Network and InternetWork Security,* W. Stallings, Prentice-Hall, Inc., 1995. The sender sends the multicast data encrypted with the DEK to the group. Next, the sender computes a one-way hash function of the data and sends the hash value (HV) along with the DEK to multicast members securely. The members also compute the hash value of multicast data and compare it to the HV received, to verify the integrity of the data.

While the encrypted multicast data is sent through traditional multicast channels, the DEKs are distributed via the key distribution tree. We use the key distribution tree in FIG. 2 to illustrate the DEK distribution. The sender generates a key distribution packet ($ES_{LSs}[[ES_{KEK1}[DEK, HV]], [ES_{LSs} [ES_{KEK2}[DEK, HV]]])$, where $LS_s$ is the subgroup key of the top level subgroup. Each of the sender's children decrypts its part of the key distribution packet. Each of them then encrypts its piece of the packet with the subgroup key they manage and multicasts the encrypted DEK to its children. In our example in FIG. 2, $P_1$ multicasts the encrypted packet that contains $ES_{LSp1}$ [$ES_{KEK1}$[DEK, HV]], to g2 and h2. Similarly, other SGMs forward the encrypted DEK to their respective subgroup members. All the members of the multicast group with a local subgroup key and the corresponding KEK acquire the DEK and HV. The DEK is used by the members to decrypt the multicast data and HV is used to verify the integrity of multicast data. Note that the SGMs that are also members of the multicast group will have access to the corresponding KEK. Other SGMs will just participate in the secure multicast protocol by managing their corresponding subgroup key and forwarding the encrypted DEK. Table 3 lists the steps in the DEK distribution protocol. In the table, we assume that there are c key groups and that SGM $g_i$, which is one of the sender's children, belongs to the key group $K_j$.

TABLE 3

Steps in the DEK Distribution Protocol s→$M_s$: . . . $ES_{LSs}[ES_{KEK1}[DEK HV]]$, . . . , $ES_{LSs}[ES_{KEKc}[DEK, HV]]$
$g_i$→$M_{gi}$: . . . $ES_{LSgi}[ES_{KEKj}[DEK,HV]]$ Leave Protocol The membership of a multicast group member may expire as per the membership duration information in the capability certificate. It is also possible that either the sender or the corresponding SGM may have to expel a misbehaving member. In either case, the ex-member of the multicast session must not be able to decrypt the multicast data. To do that, the corresponding SGM changes the local subgroup key. It then encrypts the new subgroup key with the public keys of each of its children and multicasts that information to them. Each of the children decrypts its part of that message and extracts the updated subgroup key. Revisiting our example in FIG. 2, if the host $h_9$ leaves the multicast group, the corresponding subgroup manager, $p_2$ changes the subgroup key and securely sends the new key to the hosts $h_8$ and $h_{10}$ separately.

Note that the KEK known to the leaving host need not be changed right away. The sender can periodically change those keys depending on the frequency of hosts rejoining the group. Since any member needs to know both the corresponding subgroup key and the key encrypting key to decrypt the DEK, changing even one of them is sufficient. We list the steps of the leave protocol in Table 4. In the table, we assume that $h_i$ left from SGM g, where $M_g=\{h_1, h_2, \ldots, h_m\}$ and that $LS'_g$ is the new subgroup key.

TABLE 4

Steps in the Leave Protocol g→$M_g$: $EP_{KUhi}[EP_{KRg}[LS'_g]]$,
. . . , $EP_{KUhi-1}[EP_{KRg}LS'_g]]$,
$EP_{KRg}[LS'_g]], EP_{KUi+1}[EP_{KRg}[LS'_g]]$,
. . . , $EP_{KUhm}[EP_{KRg}[LS'_g]]$ Dual encryption of the DEK simplifies the removal of an SGM from the multicast group. All we need to do is to remove the SGM, find a replacement and notify the subgroup members of the change. Note that each SGM is a member of a subgroup managed by its parent. The parent SGM removes the leaving SGM, following a procedure identical to that of removing a member of the multicast group. The sender needs to locate another SGM that replaces the leaving SGM. After finding a replacement, the sender notifies the members of the subgroup managed by the leaving SGM about their new subgroup manager. The sender also updates its lists of SGMs. The new SGM follows the join protocol to become either a participant or a member of the multicast group. After that, it generates the subgroup key and securely distributes that key to its subgroup members.

Key Refresh

The sender and the SGMs refresh their keys periodically to guard against eavesdropping. To change the subgroup key, a subgroup manager follows the same leave protocol procedure described above. In brief, the SGM changes the key, signs it and encrypts it with the public keys of all the subgroup members. It then locally multicasts the updated subgroup key to its subgroup members. Refreshing KEKs is a complex procedure is expected to be done infrequently. The sender can change a KEK following the mechanism described in join protocol section above. In general, KEKs may be refreshed depending on the frequency of hosts rejoining the multicast group.

Tuning the Number of Key Encrypting Keys The number of KEKs can be between zero and the number of SGMs in the top level subgroup. When the number of KEKs is zero all the SGMs automatically receive access to multicast data. The use of a single KEK gives us the capability of denying access of multicast data to SGMs. However, the KEK may need to be refreshed/updated more often since it is shared by all of the members. As the number of KEKs increase the refresh/update frequency decreases. The upper bound to the number of KEKs is the number of SGMs that are also members of the top level subgroup.

Notes on Implementing the Dual Encryption Protocol

We conclude the description of the dual encryption protocol by a discussion on possible modes of implementation. The first issue involves the construction of the key distribution tree. The hierarchy can be an extension of a reliable multicast tree used in RMTP. In this regard, see S. Paul, K. Sabnani, J. Lin, and S. Bhattacharyya. *Reliable Multicast Transport Protocol (RMTP)*, IEEE Journal on Selected Areas in Communications, 15(3):407421, April 1997. Alternatively, it can be implemented at the application level. In this description of DEP, we designate the sender as the group manager. In reality, it may not be possible for the sender to handle the workload of enforcing a secure multicast protocol. We suggest the use of a trusted third party to manage the secure multicast group in such cases.

Next, we discuss the selection of subgroup managers. As described earlier, SGMs can either be routers or hosts in the Internet that are capable of handling the workload of managing a subgroup. Also, an SGM should not actively participate in disrupting the secure multicast protocol. Any router or host which meets these requirements can be chosen as an SGM. The requirements may be stricter if the SGM wants to be a member as well. The membership duration needs to be taken into consideration in this case.

Locating the SGMs is the next problem. We suggest the use of anycast to the multicast group as a possible solution. Alternatively, routers in the network may maintain a database of SGMs corresponding to a secure multicast group. Newly joining host may then request the router for the SGM addresses.

The number of members in each subgroup and the number of levels in the key distribution tree are other crucial design parameters. Recall that the subgrouping is to avoid the 1 affects n scalability problem. If a subgroup is very large we may run into scalability problems. Also note that all the SGMs translate the encrypted KEKs for their subgroup members. As the number of levels in the key distribution tree increases, the number of translations increase. With increased number of translations the latency in distributing the keys may become significant.

While the invention has been described in its presently preferred embodiments, it will be understood that the invention is capable of certain modification and change without departing from the spirit of the invention as set forth in the appended claims.

What is claimed is:

1. A method for adding a host to a multicast group comprising the steps of:
    identifying a key group and a subgroup for said host to join, said key group defined by a child node of a sender of multicast data and all descendant nodes of said child node of said sender, said subgroup defined by a subgroup manager and all child nodes of said subgroup manager;
    said sender issuing a first encryption key to said host, said first encryption key corresponding to said key group; and
    said subgroup manager issuing a second encryption key to said host, said second encryption key corresponding to said subgroup, both said first encryption key and said second encryption key required to access a data encryption key, said data encryption key providing access to said multicast data.

2. The method of claim 1 wherein said host requests authorization from the sender by providing its identity.

3. The method of claim 2 wherein the identity of said host is provided by a capability certificate or access control list.

4. The method of claim 1 further comprising the steps of:
    transmitting a capability certificate from said host to said subgroup manager;
    said subgroup manager verifying said capability certificate; and
    said subgroup manager transmitting a key group identifier and a subgroup manager identifier to said host when said capability certificate is valid.

5. The method of claim 1 further comprising the steps of:
    transmitting a capability packet from said host to said sender;
    said sender verifying said capability packet;
    said sender transmitting said first encryption key and an authorization certificate to said host when said capability packet is valid, said first encryption key and said authorization certificate encrypted with a public encryption key for said host; and
    said sender updating a member database, said member database representing nodes of said multicast group entitled to said multicast data.

6. The method of claim 5 wherein said capability packet comprises authentification information, a subgroup manager identifier and a key group identifier.

7. The method of claim 5 further comprising the step of verifying that said host has not previously requested to join said multicast group.

8. The method of claim 1 further comprising the steps of:
    transmitting an authorization certificate from said host to said subgroup manager, said authorization certificate encrypted with said host's private encryption key;
    said subgroup manager verifying said private encryption key;
    said subgroup manager changing said second encryption key;
    said subgroup manager issuing said changed second encryption key to said host; and
    said subgroup manager issuing said changed second encryption key to remaining child nodes of said subgroup manager.

9. The method of claim 1 further comprising the step of recruiting a participant subgroup manager, said participant subgroup manager representing a node which is not entitled to said multicast data.

10. The method of claim 9 wherein said participant subgroup manager has access to only one of said first and second keys and therefore cannot decrypt said multicast data.

11. The method of claim 9 further comprising the steps of:
    determining whether said participant subgroup manager is in a member database;
    said sender changing said first encryption key corresponding to said key group when said participant subgroup manager is in said member database;
    said sender issuing said first encryption key to members of said key group, said members defined by child nodes holding said first encryption key before it was changed.

12. A multicast group comprising:
    a logical tree structure, said structure having a sender node and said sender node having one or more child nodes;
    a key group, said key group defined by a child node of said sender node and all descendant nodes of said child node, said sender node issuing a first encryption key to member nodes of said key group after verifying that said member nodes have not previously requested to join the multicast group, said member nodes defined by nodes of said key group; and
    a subgroup, said subgroup defined by a subgroup manager and child nodes of said subgroup manager, said subgroup manager issuing a second encryption key to said subgroup, both said first encryption key and said second encryption key required to access a data encryption key, said data encryption key providing access to multicast data.

13. The multicast group of claim 12 further comprising a member database representing nodes of said multicast group entitled to said multicast data, wherein said subgroup manager is excluded from said member database.

14. The method of claim 1 further comprising a method for deleting a predetermined host from said multicast group comprising the steps of:
    said subgroup manager changing said second encryption key to a third encryption key and sending said third encryption key to all members of said subgroup excluding said predetermined host.

15. The method of claim 14 wherein said first encryption key remains unchanged.

16. A system for implementing scalable secure multicasting comprising:
    a hierarchical structure of nodes logically organized as one or more subgroups each subgroup having an associated subgroup manager and at least one child node that functions as the recipient of multicast information;
    said subgroup manager issuing a subgroup key for use by its associated subgroup;
    said hierarchical structure of nodes further having a root node that functions as the sender of multicast information, the root node and its hierarchically adjacent children logically defining a plurality of key groups;

said sender separately issuing a key group key to each of said key groups;

said sender supplying multicasting information to said host using a dual encryption protocol such that both subgroup key and key group key are required at said host to decrypt the multicast information, one or more of said subgroup managers being a participant subgroup manager, wherein said participant subgroup managers are not entitled to the multicast information; and said sender determining whether said participant subgroup managers are in a member database.

* * * * *